US008261549B2

(12) United States Patent
Kardos et al.

(10) Patent No.: US 8,261,549 B2
(45) Date of Patent: *Sep. 11, 2012

(54) ARRANGEMENT FOR RECIRCULATION OF EXHAUST GASES OF A SUPERCHARGED INTERNAL COMBUSTION ENGINE

(75) Inventors: Zoltan Kardos, Södertälje (SE); Hans Wikström, Johanneshov (SE)

(73) Assignee: Scania CV AB (Publ) (SE)

( * ) Notice: Subject to any disclaimer, the term of this patent is extended or adjusted under 35 U.S.C. 154(b) by 515 days.

This patent is subject to a terminal disclaimer.

(21) Appl. No.: 11/913,636

(22) PCT Filed: May 8, 2006

(86) PCT No.: PCT/SE2006/050110
§ 371 (c)(1),
(2), (4) Date: Dec. 6, 2007

(87) PCT Pub. No.: WO2006/123992
PCT Pub. Date: Nov. 23, 2006

(65) Prior Publication Data
US 2008/0271451 A1 Nov. 6, 2008

(30) Foreign Application Priority Data

May 18, 2005 (SE) ........................ 0501123

(51) Int. Cl.
*F02B 33/44* (2006.01)
(52) U.S. Cl. ..................................................... 60/605.2
(58) Field of Classification Search ............ 60/600, 60/602, 599, 605.2, 604, 616; 123/568.12
See application file for complete search history.

(56) References Cited

U.S. PATENT DOCUMENTS

| | | | |
|---|---|---|---|
| 5,607,010 A * | 3/1997 | Schonfeld et al. | 165/51 |
| 5,740,786 A * | 4/1998 | Gartner | 123/568.12 |
| 5,791,146 A * | 8/1998 | Dungner | 60/605.2 |
| 5,794,445 A * | 8/1998 | Dungner | 60/605.2 |
| 5,937,651 A * | 8/1999 | Braun et al. | 60/605.2 |
| 6,038,860 A * | 3/2000 | Bailey | 60/605.2 |

(Continued)

FOREIGN PATENT DOCUMENTS

EP   1 091 113   4/2001

(Continued)

OTHER PUBLICATIONS

PCT International Search Report dated Aug. 1, 2006 issued in corresponding PCT International Appln. No. PCT/SE2006/050110.

*Primary Examiner* — Thomas Denion
*Assistant Examiner* — Cameron Setayesh
(74) *Attorney, Agent, or Firm* — Ostrolenk Faber LLP

(57) ABSTRACT

The present invention relates to an arrangement for recirculation of exhaust gases of a supercharged combustion engine. The arrangement comprises an exhaust line intended to lead exhaust gases out from the combustion engine, an inlet line intended to lead air to the combustion engine, a compressor adapted to compressing the air in the inlet line to above atmospheric pressure, and return line which connects the exhaust line to the inlet line. The arrangement comprises an EGR cooler in which the recirculating exhaust gases in the return line are cooled by the air in a portion of the inlet line which is situated upstream of the compressor with respect to the direction of flow of the air in the inlet line.

7 Claims, 1 Drawing Sheet

U.S. PATENT DOCUMENTS

| | | | |
|---|---|---|---|
| 6,138,649 A * | 10/2000 | Khair et al. | 123/568.12 |
| 6,237,335 B1 * | 5/2001 | Lonnqvist | 60/605.2 |
| 6,244,256 B1 * | 6/2001 | Wall et al. | 123/568.12 |
| 6,324,846 B1 * | 12/2001 | Clarke | 60/605.2 |
| 6,729,133 B1 | 5/2004 | Sorter et al. | 60/599 |
| 6,935,319 B2 * | 8/2005 | Aupperle et al. | 123/568.12 |
| 6,981,375 B2 * | 1/2006 | Sisken et al. | 60/612 |
| 7,013,879 B2 * | 3/2006 | Brookshire et al. | 123/568.12 |
| 7,043,914 B2 * | 5/2006 | Ishikawa | 60/605.2 |
| 7,080,511 B1 * | 7/2006 | Bolton et al. | 60/611 |
| 7,131,271 B2 * | 11/2006 | Bulicz et al. | 60/605.2 |
| 7,165,540 B2 * | 1/2007 | Brookshire et al. | 123/568.12 |
| 7,168,250 B2 * | 1/2007 | Wei et al. | 60/605.2 |
| 7,195,006 B2 * | 3/2007 | Khair et al. | 123/568.12 |
| 7,210,468 B1 * | 5/2007 | Saele | 123/568.12 |
| 7,210,469 B1 * | 5/2007 | Saele | 123/568.12 |
| 7,322,193 B2 * | 1/2008 | Bering et al. | 60/605.2 |
| 7,343,743 B2 * | 3/2008 | Dismon et al. | 60/605.2 |
| 7,464,700 B2 * | 12/2008 | Kolb | 123/563 |
| 7,469,691 B2 * | 12/2008 | Joergl et al. | 123/568.12 |
| 7,490,462 B2 * | 2/2009 | Roozenboom et al. | 60/278 |
| 7,594,398 B2 * | 9/2009 | Gronberg | 60/605.2 |
| 7,617,679 B2 * | 11/2009 | Kardos et al. | 60/605.2 |
| 7,621,128 B2 * | 11/2009 | Czarnowski et al. | 60/605.2 |
| 7,650,753 B2 * | 1/2010 | Muller et al. | 60/599 |
| 2004/0093866 A1 * | 5/2004 | Ishikawa | 60/605.2 |
| 2004/0200221 A1 * | 10/2004 | Sorter et al. | 60/599 |
| 2005/0103013 A1 * | 5/2005 | Brookshire et al. | 60/605.2 |
| 2005/0247284 A1 * | 11/2005 | Weber et al. | 123/299 |
| 2006/0075995 A1 * | 4/2006 | Liu et al. | 123/568.12 |
| 2006/0117749 A1 * | 6/2006 | Sumser | 60/599 |
| 2006/0266018 A1 * | 11/2006 | Durand | 60/276 |
| 2007/0044469 A1 * | 3/2007 | Harada et al. | 60/599 |
| 2007/0044472 A1 * | 3/2007 | Zhang | 60/605.2 |
| 2007/0089716 A1 * | 4/2007 | Saele | 123/568.12 |
| 2007/0089717 A1 * | 4/2007 | Saele | 123/568.12 |
| 2007/0204619 A1 * | 9/2007 | Pelz et al. | 60/605.2 |
| 2007/0277523 A1 * | 12/2007 | Muller et al. | 60/599 |
| 2008/0047267 A1 * | 2/2008 | Kardos et al. | 60/605.2 |
| 2008/0190109 A1 * | 8/2008 | Kardos et al. | 60/605.2 |
| 2008/0256949 A1 * | 10/2008 | Wikstrom et al. | 60/605.2 |
| 2010/0064685 A1 * | 3/2010 | Auffret et al. | 60/602 |

FOREIGN PATENT DOCUMENTS

| | | |
|---|---|---|
| JP | 08082256 A * | 3/1996 |
| WO | WO 00/77353 | 12/2000 |

* cited by examiner

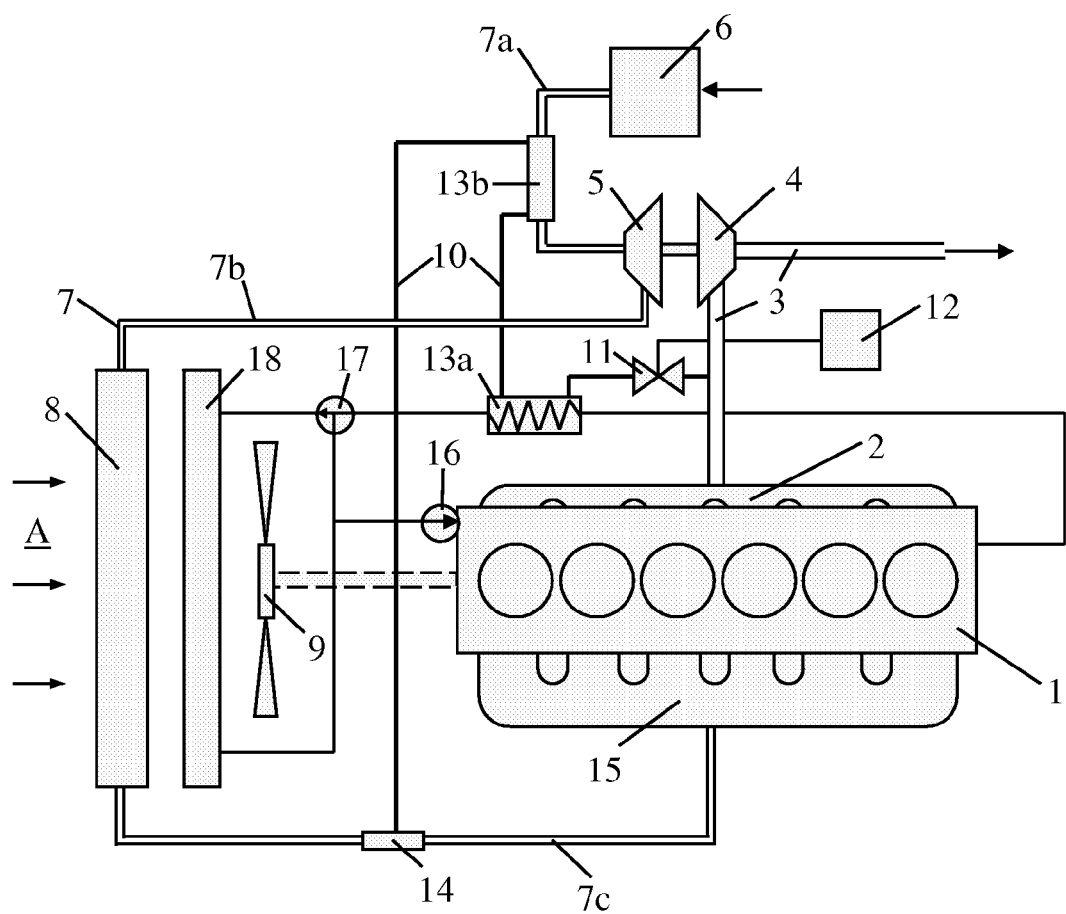

ARRANGEMENT FOR RECIRCULATION OF EXHAUST GASES OF A SUPERCHARGED INTERNAL COMBUSTION ENGINE

CROSS REFERENCE TO RELATED APPLICATION

The present application is a 35 U.S.C. §§371 national phase conversion of PCT/SE2006/050110, filed May 8, 2006, which claims priority of Swedish Patent Application No. 0501123-4, filed May 18, 2005, the disclosure of which has been incorporated herein by reference.

BACKGROUND TO THE INVENTION, AND STATE OF THE ART

The present invention relates to an arrangement for recirculation of exhaust gases of a supercharged combustion engine according to the preamble of claim 1.

The technique known as EGR (Exhaust Gas Recirculation) is a known means of leading part of the exhaust gases from a combustion process in a combustion engine back, via a return line, to an inlet line for supply of air to the combustion engine. A mixture of air and exhaust gases is thus supplied via the inlet line to the engine's cylinders in which the combustion takes place. Adding exhaust gases to the air causes a lower combustion temperature which results inter alia in a reduced content of nitrogen oxides $NO_x$ in the exhaust gases. This technique is used for both Otto engines and diesel engines.

Providing such recirculation of exhaust gases involves arranging a return line in an engine space of the vehicle. The purpose of such a return line is to lead the exhaust gases from an exhaust line arranged on the warm side of the combustion engine to an inlet line for air arranged on the cold side of the combustion engine. The return line comprises a plurality of components such as an EGR valve for controlling the exhaust gas flow through the return line, an EGR cooler for cooling the recirculating exhaust gases, and pipeline portions for leading exhaust gases from the warm side to the cold side. The location of the EGR cooler in the vehicle is usually such that the return line has to be unnecessarily long and space-consuming.

The amount of air which can be supplied to a supercharged combustion engine depends on the pressure of the air but also on the temperature of the air. In order to supply as large an amount of air as possible to the combustion engine, the compressed air is cooled in a charge air cooler before it is led to the combustion engine. The compressed air is cooled in the charge air cooler by ambient air which is led through the charge air cooler. The compressed air can thus be cooled to a temperature which exceeds the temperature of the surroundings by only a few degrees. The returned exhaust gases are usually cooled in an EGR cooler which uses the coolant of the combustion engine's cooling system as cooling medium. Such an EGR cooler is therefore subject to the limitation that the exhaust gases cannot be cooled to a lower temperature than the temperature of the coolant. The cooled exhaust gases are therefore usually at a higher temperature than the cooled compressed air when they mix in the inlet line to the combustion engine. The mixture of exhaust gases and air which is led to the combustion engine will therefore be at a higher temperature than the compressed air which is led into a corresponding supercharged combustion engine without recirculation of exhaust gases. The performance of a supercharged combustion engine equipped with EGR will thus be somewhat inferior to that of a supercharged combustion engine not equipped with EGR.

SUMMARY OF THE INVENTION

The object of the present invention is to provide an arrangement which effects recirculation of exhaust gases of a combustion engine whereby the return line can be of substantially minimum length and the arrangement as a whole be made compact and occupy little space. Another object is to provide an arrangement which effects recirculation of exhaust gases of a supercharged combustion engine whereby the recirculation of exhaust gases does not result in the performance of the combustion engine being inferior to that of a corresponding combustion engine without recirculation of exhaust gases.

These objects are made possible by the arrangement of the kind mentioned in the introduction which is characterised by the features indicated in the characterising part of claim 1. The flowing air in the inlet line constitutes an existing cooling medium source situated close to the combustion engine. An EGR cooler which uses this cooling medium source can therefore be fitted in direct proximity to or on the combustion engine. The return line which comprises such an EGR cooler can therefore be made short and compact so that the exhaust gases undergo only a small pressure drop as they pass through the return line. A small pressure drop in the return line is necessary for being able to achieve low fuel consumption and for ensuring that exhaust gases can without problems be led into the inlet line and mix with the compressed air. As the compressor already draws in and conveys air in the inlet line, no further flow devices need usually be applied in the inlet line in order to provide a flow of air through the EGR cooler. It is therefore relatively uncomplicated to arrange close to the combustion engine such an EGR cooler which thus uses this already existing air flow in the inlet line upstream of the compressor in order to cool the exhaust gases in the return line. The air in the inlet line is usually at a relatively low temperature before it is compressed. The inlet air can therefore be used with advantage for cooling the exhaust gases in the EGR cooler to a substantially corresponding low temperature.

According to a preferred embodiment of the present invention, the air which is drawn into the inlet line is ambient air. The air is therefore at substantially the temperature of the surroundings when it is led into the EGR cooler. With a suitably dimensioned EGR cooler it is therefore possible to cool the exhaust gases to a temperature close to the temperature of the surroundings.

According to another preferred embodiment of the invention, the arrangement comprises a first EGR cooler which is adapted to subjecting the recirculating exhaust gases in the return line to a first step of cooling before they undergo a second step of cooling in the abovementioned EGR cooler. The exhaust gases from a diesel engine are usually at a temperature of about 600-700° C. Using the air in the inlet line before the compressor to cool the exhaust gases in a single step to a temperature close to the temperature of the surroundings is usually not possible. It is therefore advantageous to arrange a first EGR cooler which subjects exhaust gases to a first step of cooling before they undergo a second step of cooling by the air in a second EGR cooler. With advantage, the recirculating exhaust gases are adapted to being cooled by a liquid medium in the first EGR cooler. A liquid medium usually provides more effective cooling than a gaseous medium. A first EGR cooler with a liquid cooling medium can therefore be made smaller than an EGR cooler of comparable capacity in which a gaseous cooling medium is used. A first liquid-cooled EGR cooler in the return line can effectively lower the temperature of the exhaust gases as a first step. Combustion engines are usually cooled by cooling systems by means of a circulating coolant. The recirculating exhaust gases in the return line can with advantage be cooled in the first EGR cooler by means of said coolant. In such cases the existing coolant in the vehicle's cooling system is used for subjecting the exhaust gases to a first step of cooling. Even if the temperature of the coolant is higher than the temperature of the surrounding air, the result is a large enough difference between the temperature of the coolant and the temperature of the exhaust gases to achieve effective cooling of the exhaust gases. The exhaust gases can thus be cooled as a first step to a temperature of about 100° C.

According to another preferred embodiment of the invention, the arrangement comprises a charge air cooler adapted to cooling the compressed air in the inlet line to the combustion engine. The compressed air reaches at a relatively high temperature after the compression. When the air in the inlet line is also used for cooling the exhaust gases, the air needs still more cooling in the charge air cooler. The amount of air which can be supplied to a supercharged combustion engine depends on the pressure and temperature of the air. In order to supply as large an amount of air as possible to the combustion engine, the compressed air needs to undergo effective cooling in the charge air cooler before it is led into the combustion engine. With advantage, the compressed air is adapted to being cooled in the charge air cooler by a medium which is at the temperature of the surroundings. The compressed air can thus be cooled to a temperature only a few degrees above the temperature of the surroundings. Said medium is preferably ambient air. Ambient air is suitable for the purpose since it is always available and can easily be caused to flow through the charge air cooler.

According to another preferred embodiment of the invention, the charge air cooler and a radiator for the combustion engine's cooling system are fitted in a common region through which ambient air flows. Such a region may be at a front portion of a vehicle which is powered by said combustion engine. In such cases, a common radiator fan may be used for circulating ambient air through both the charge air cooler and the radiator. The charge air cooler is preferably fitted upstream of the radiator in said common region with respect to the direction of flow of the air. Ambient air thus flows through the charge air cooler before flowing through the radiator. There is thus assurance of the compressed air being cooled by air which is at the temperature of the surroundings, thereby making it possible to cool the compressed air to a temperature close to the temperature of the surroundings. The ambient air flowing through the radiator thereby acquires a somewhat higher temperature, but this temperature is sufficient for the coolant to undergo effective cooling in the radiator.

BRIEF DESCRIPTION OF THE DRAWING

A preferred embodiment of the invention is described below by way of example with reference to the attached drawing, in which:

FIG. 1 depicts an arrangement for recirculation of exhaust gases of a supercharged combustion engine

DETAILED DESCRIPTION OF A PREFERRED EMBODIMENT OF THE INVENTION

FIG. 1 depicts an arrangement for recirculation of exhaust gases of a supercharged combustion engine. The combustion engine in this case is a diesel engine 1. Such recirculation is usually called EGR (Exhaust Gas Recirculation). Adding exhaust gases to the compressed air which is led to the engine's cylinders lowers the combustion temperature and hence also the content of nitrogen oxides ($NO_x$) formed during combustion processes. The diesel engine 1 may be intended to power a heavy vehicle. The exhaust gases from the cylinders of the diesel engine 1 are led via an exhaust manifold 2 to an exhaust line 3. The exhaust gases in the exhaust line 3, which are at above atmospheric pressure, are led to a turbine 4. The turbine 4 is thus provided with driving power which is transmitted, via a connection, to a compressor 5. Via an air filter 6, the compressor 5 draws ambient air into a first portion 7a of an inlet line 7. The air is compressed by the compressor 5, with the result that it reaches above atmospheric pressure and a relatively high temperature. Downstream of the compressor 5, the air is led through a second portion 7b of the inlet line. A charge air cooler 8 is arranged in the second portion of the inlet line 7b in order to cool the compressed air. The compressed air is cooled in the charge air cooler 8 by ambient air which is caused to flow through the charge air cooler 8 by a radiator fan 9. The radiator fan 9 is driven by the diesel engine 1 via a suitable connection.

An arrangement for effecting recirculation of part of the exhaust gases in the exhaust line 3 comprises a return line 10 which extends between the exhaust line 3 and a third portion 7c of the inlet line 7. The return line 10 comprises an EGR valve 11 by which the exhaust flow in the return line 10 can be shut off as necessary. The EGR valve 11 can also be used for controlling the amount of exhaust gases led from the exhaust line 3 via the return line 10 to the third portion 7c of the inlet line. A control unit 12 is adapted to controlling the EGR valve 11 on the basis of information about the prevailing operating state of the diesel engine 1. The control unit 12 may be a computer unit provided with suitable software. The return line 10 comprises a first EGR cooler 13a in which the exhaust gases undergo a first step of cooling and a second EGR cooler 13b in which the exhaust gases undergo a second step of cooling. In certain operating states of a supercharged combustion engine 1, the pressure of the exhaust gases in the exhaust line 3 is lower than the pressure of the compressed air in the second portion 7b of the inlet line. In such operating situations it is not possible to mix the exhaust gases in the return line 10 directly with the compressed air from the second portion 7b of the inlet line without special auxiliary means. A venturi 14 may for example be used for the purpose. If the combustion engine is a supercharged Otto engine, however, the exhaust gases in the return line 10 can usually be mixed directly with the air from in the second portion 7b of the inlet line, since the exhaust gases in the exhaust line 3 of an Otto engine in substantially all operating states are at a higher pressure than the compressed air in the second portion 7b of the inlet line. When the exhaust gases have mixed with the compressed air from the second portion 7b of the inlet line, the mixture is led to the respective cylinders of the diesel engine 1 via the third portion 7c of the inlet line and a manifold 15.

The diesel engine 1 is cooled in a conventional manner by a cooling system with a coolant which is circulated by a coolant pump 16. The cooling system also comprises a thermostat 17 and a radiator 18. The radiator 18 is situated behind the charge air 5 cooler 8 in the first region A, which has ambient air flowing through it. During operation of the diesel engine 1, the exhaust gases in the exhaust line 3 drive the turbine 4 before they are led out to the environment. The turbine 4 is thus provided with driving power which drives the compressor 5. The compressor 5 thus compresses the ambient air in the first portion 7a of the inlet line. The compressed air in the second portion 7b of the inlet line is cooled by ambient air which flows through the charge air cooler 8. The compressed air in the charge air cooler 8 is thus cooled to a temperature which exceeds the temperature of the surroundings by only a few degrees.

In most operating states of the diesel engine 1, the control unit 12 keeps the EGR valve 11 open so that part of the exhaust gases in the exhaust line 3 is led into the return line 10. The exhaust gases in the exhaust line 3 are at a temperature of about 600-700° C. When the exhaust gases in the return line 10 are led into the first EGR cooler 13a, they undergo cooling by the coolant in the cooling system of the combustion engine 1. However, the first EGR cooler 13a is subject to the limitation that it can at most cool the exhaust gases to a temperature corresponding to the temperature of the coolant. The temperature of the coolant in the cooling system may vary but in normal operation is usually within the range 80-100° C. The exhaust gases nevertheless undergo with advantage their main temperature reduction in the first EGR cooler 13a so that they are at a temperature of about 100° C. when they leave the first EGR cooler 13a. The amount of compressed air and exhaust gases which can be supplied to the diesel engine 1 depends on the pressure and temperature of the air and the exhaust gases. It is therefore important to provide further cooling of the recirculating exhaust gases. The exhaust gases are therefore subjected in the second EGR cooler 13b to a second step of cooling by the air in the first portion 7a of the inlet line before it is compressed by the compressor 5. The air in the first portion 7a of the inlet line is at substantially the temperature of the surroundings. By suitable dimensioning of the second EGR cooler 13b, the exhaust gases undergo a second step of cooling to a temperature only a few degrees above the temperature of the surroundings. The flowing air in the first portion 7a of the inlet line constitutes an existing cooling medium source situated close to the combustion engine 1. The second EGR cooler 13b can therefore be fitted in direct proximity to or on the combustion engine 1. The return line 10 can thus be made very short and compact so that the exhaust gases undergo only a small pressure drop in the return line 10. A small pressure drop in the return line 10 is necessary for being able to achieve low fuel consumption and for ensuring that the exhaust gases can without problems be led into the return line 10 and mix with the compressed air from the second portion 7b of the inlet line.

The charge air cooler 8 and the cooling system's radiator 18 are thus situated in a common region A through which ambient air flows. The region A may be a region at a front portion of a vehicle which is powered by the combustion engine 1. The charge air cooler 8 is fitted in front of the radiator 18 to ensure that air which is at the temperature of the surroundings flows through it and cools it. By suitable dimensioning of the charge air cooler 8, the air in the charge air cooler 8 can thus be cooled to a temperature close to the temperature of the surroundings. The air which cools the coolant in the radiator 18 thus acquires a temperature which is somewhat higher than the surroundings but is usually quite sufficient for cooling the coolant in the radiator 18, since there is no need for the coolant in the radiator 18 to be cooled to a temperature equal to the temperature of the surroundings. The coolant in the cooling system of the combustion engine 1 is thus also used for subjecting the exhaust gases to a first step of cooling in the first EGR cooler 13a. The radiator 18 therefore needs a somewhat greater capacity. The air in the first portion 7a of the inlet line is used for cooling the exhaust gases in the second EGR cooler 13b. The air in the second portion 7b of the inlet line thus acquires a raised temperature. The charge air cooler 8 therefore needs a somewhat greater capacity.

In certain operating states of a supercharged combustion engine 1, the pressure of the exhaust gases in the exhaust line 3 is thus lower than the compressed air pressure from the second portion 7b of the inlet line. It is possible, e.g. by means of said venturi 14, for the static pressure from the second portion 7b of the inlet line to be reduced locally, at the connection to the return line 10, so that the exhaust gases can be led into and mix with the compressed air in the third portion 7c of the inlet line. The mixture of exhaust gases and compressed air is thereafter led to the respective cylinders of the diesel engine 1 via the manifold 15. By such cooling in two steps in the EGR coolers 13a, b it is thus possible for a diesel engine 1 equipped with EGR to be provided with recirculating exhaust gases at a temperature substantially corresponding to the temperature of the compressed air after it has been cooled in the charge air cooler 8. The mixture of exhaust gases and compressed air which is led to the diesel engine 1 will thus be at a temperature substantially corresponding to that of the compressed air which is led to a diesel engine without EGR. The present invention thus makes it possible for a diesel engine equipped with EGR to present performance substantially corresponding to that of a diesel engine not equipped with EGR.

The invention is in no way limited to the embodiments described with reference to the drawing but may be varied freely within the scopes of the claims.

The invention claimed is:

1. An arrangement for recirculation of exhaust gases of a supercharged combustion engine block, the arrangement comprising:
   an exhaust line configured and operative to lead exhaust gases out from the combustion engine;
   an inlet line configured and operative to lead air to the combustion engine, the inlet line comprising a first inlet line portion having a beginning at a vehicle fresh air intake point and terminating at a compressor, the first inlet line portion positioned upstream of the compressor with respect to the direction of flow of the air in the inlet line;
   the compressor configured and operative to compress the air in the inlet line to above atmospheric pressure;
   a return line which connects the exhaust line to the inlet line, the return line being configured and operative to recirculate exhaust gases from the exhaust line to the inlet line;
   a first Exhaust Gas Recirculation (EGR) cooler configured and operative to subject the recirculating exhaust gases in the return line to a first step of cooling by a liquid coolant flowing through the combustion engine block; and
   a second EGR cooler configured and operative to cool the recirculated exhaust gases in the return line by the air in the first inlet line portion of the inlet line.

2. An arrangement according to claim 1, wherein the air drawn into the inlet line is ambient air.

3. An arrangement according to claim 1, wherein the arrangement comprises a charge air cooler configured and adapted for cooling the compressed air in the inlet line.

4. An arrangement according to claim 3, wherein the charge air cooler is configured and positioned to cool the compressed air by a medium which is at the temperature of the surroundings.

5. An arrangement according to claim 4, wherein said medium is ambient air.

6. An arrangement according to claim 5, wherein the combustion engine comprises a radiator configured and operative to dissipate heat from the liquid coolant circulating through and cooling the combustion engine block, the charge air cooler and the radiator are positioned and fitted in a common region through which ambient air flows.

7. An arrangement according to claim 6, wherein the charge air cooler is positioned and fitted upstream of the radiator in said common region with respect to the direction of flow of the ambient air.

* * * * *